S. GULBRANDSEN.

INCANDESCENT MANTLE.

APPLICATION FILED DEC. 1, 1916.

Reissued Jan. 2, 1917.

14,241.

WITNESSES

H. M. Monroe

R. A. Balderson

INVENTOR

S. Gulbrandsen by Bakewell, Byrnes & Parmelee

Attys.

THE MORRIS PETERS CO., PHOTO-LITHO., WASHINGTON, D. C.

UNITED STATES PATENT OFFICE.

SVERRE GULBRANDSEN, OF WOODBURY, NEW JERSEY, ASSIGNOR TO WELSBACH LIGHT COMPANY, OF GLOUCESTER CITY, NEW JERSEY, A CORPORATION OF NEW JERSEY.

INCANDESCENT MANTLE.

14,241. Specification of Reissued Letters Patent. Reissued Jan. 2, 1917.

Original No. 1,133,470, dated March 30, 1915, Serial No. 836,671, filed May 6, 1914. Application for reissue filed December 1, 1916. Serial No. 134,537.

*To all whom it may concern:*

Be it known that I, SVERRE GULBRANDSEN, a citizen of the United States, residing at Woodbury, in the county of Gloucester and State of New Jersey, have invented a new and useful Improvement in Incandescent Mantles, of which the following is a full, clear, and exact description, reference being had to the accompanying drawings, forming part of this specification, in which—

Figure 1:
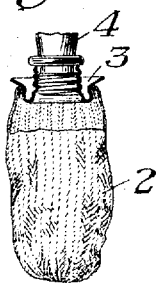
Figure 2:
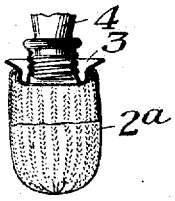

Figure 1 is a side view partly in section of my improved inverted limp mantle in position prior to ignition and use; and Fig. 2 is a similar view showing the mantle after shaping in actual burning use.

My invention relates to inverted incandescent mantles of the limp or rag type; and is designed to provide a mantle of this type which will give a superior light and which will shape itself under burning in actual use on ordinary city gas pressures. On ordinary city pressures, a closed top mantle of the usual size (from one and one-eighth inches to one and three-eighths inches in diameter) gives very little incandescence and therefore very little light. Furthermore, it presents a characteristic appearance in that it has a heavy and local flame surrounding it and extending to a distance of approximately a quarter of an inch from the exterior surface of the mantle. Attempts to bring the flame nearer to the mantle surface by cutting down the gas supply at the orifice of the burner are unsuccessful, as such attempts cause an even further dulling of the light. In fact, there is no adjustment possible by which the flame can be concentrated in such mantle at the mantle surface, since the supply of gas necessary for heating the mantle will be too great for the air entrained to form perfect combustion and if the gas supply is reduced to form the proper mixture with the air entrained, the supply of fuel is too small to heat the mantle up to the proper incandenscence. The action of a closed top mantle of the usual size, as above described, with ordinary city gas pressures, is due to the following facts. The air (primary air) entrained by the gas stream is very considerably less than that required for the complete combustion of the gas. The balance of the air (secondary air) is therefore taken from around the mantle. This means that all the gas has to pass through the meshes of the mantle and travel some distance from the surface thereof before it finds sufficient air for complete combustion. This causes the heat of the flame to be dissipated into space instead of being made effective at the mantle surface. With an open-top shaped mantle of the usual size, this difficulty is not present because some of the products of combustion find a vent through the space between the mantle ring and the burner tip, thus establishing a sort of chimney effect which allows the secondary air to sweep closer to the mantle. This brings the zone of combustion nearer to the mantle surface and increases the incandescence. I have discovered that if rag or limp mantles are made of very considerably smaller size than those heretofore in use—say seven-eighths of an inch diameter, or less—they can be made to incandesce brilliantly, even on ordinary city pressures, and that the flame will be located close to the mantle surface; and that such mantle will also properly shape itself in the burning operation. The action of such a mantle is in fact radically different from the action of a similar mantle of the usual size. This is due to the fact that as the size of the mantle is decreased beyond a certain point its surface becomes much larger in comparison with its volume or flame capacity. In such a mantle therefore it becomes possible for the gas to obtain a sufficient supply of secondary air much closer to the mantle surface. The amount of gas required being relatively small this will entrain more nearly the proper proportion of primary air, and moreover the required supply of this secondary air is much less. There is another important factor which also enters into this result. In every mantle a certain amount of combustion takes place on the inside of the mantle between the gas and the primary air. In an open Bunsen flame this combustion takes place at the inner cone of the flame, which, as is known, is its hottest part. In the small mantle produced by my invention this primary combustion is caused to take place very considerably closer to the mantle surface than is the case in a large mantle. The proximity of this very hot zone to the mantle walls produces a higher incandescence. The difficulties heretofore experienced with large size rag mantles with closed tops, when used with ordinary city gas pressures have limited their use to systems having high pressure gas. In such systems, on account of the greater velocity of the gas stream, much more primary air is entrained so that the volume of secondary air required is reduced to such an extent that the flame is brought much nearer to the mantle surface. Many efforts have been made to develop a rag or limp mantle which could be used on ordinary city gas pressure systems; but so far as I am aware none of these has heretofore proved successful. If made with an open top they would not blow out to a satisfactory shape; and if closed at the top they would not give a satisfactory light for the reasons above stated.

My invention is based upon the discovery that the flame capacity of a rag mantle must bear a certain relation to its surface area; and that when the diameter of the mantle does not exceed seven-eighths of an inch, when shaped, the mantle has a flame capacity which bears such a relation to its surface area that the desired efficiency, together with proper shaping, may be obtained with ordinary city gas pressures.

Another way of defining my improved mantle is that the ratio of the surface in square inches to the volume in cubic inches is not less than five; that is, its surface in square inches is not less than five times its volume in cubic inches. (These measurements refer to the finished shaped mantle.) Of course, the volume-capacity of a mantle increases much more rapidly than its area with increasing diameters, and I have found that it is for this reason that the mantle must be below a certain diameter when shaped, in order to give the proper results and allow shaping in place under burning conditions.

In the drawings, 2 represents a limp or rag mantle having its mouth tied, or otherwise secured within the annular recess of a metal carrier 3. This metal carrier in the form shown has an internal screw-threaded stem which is adapted to screw on the correspondingly threaded tip of an inverted incandescent burner.

In using these small mantles, they are simply screwed in place on the inverted burners and the organic fabric burned off with a match or taper; the mixture of gas and air is then turned on and ignited, the mantles then shaping into approximately the form shown at $2^a$ in Fig. 2, under ordinary city gas pressures. The mantles thus shaped are good in appearance and give good efficiency in burning. The best results are obtained by using mantles which, when shaped, have a diameter of from five-eighths to one-half of an inch, and seven-eighths of an inch to one inch is the outside limit which can be used in this manner. I also prefer to use mantles which are not less than one-fourth of an inch in diameter when burned and shaped.

The advantages of my invention will be obvious to those skilled in the art. The expense and delay incident to burning, shaping, hardening and collodionizing in the factory are done away with, the danger of injury to the mantle in shipping avoided, the mantles may be packed together in small compass, and an effective and cheaper mantle thus provided.

As these mantles may be sold at low cost owing to the reduced expense of manufacture, and in the small diameter the mantles in connection with the closed end will properly shape under ordinary gas pressures, they present a decided advance in this art and widen the field available for inverted incandescent mantles.

Variations may be made in the material used for the fabric, in the shape of the mantle and in the method of attaching it to the burner tip, without departing from my invention.

I claim:

1. As a new article of manufacture, a limp mantle reduced in size to less than one inch diameter when shaped, and adapted for connection to burners using ordinary gas pressures, and a carrier having a correspondingly reduced opening to which the open end of the mantle is secured, substantially as described.

2. As a new article of manufacture, a limp mantle reduced in size to less than one inch diameter when shaped, and adapted for connection to burners using ordinary gas pressures, and a carrier having a correspondingly reduced opening to which the open end of the mantle is secured, said carrier having a screw-threaded portion adapted to screw snugly on a burner tip, substantially as described.

3. As a new article of manufacture, a reduced limp mantle adapted for connection to burners using ordinary city gas pressures, said mantle having its surface area not less than five times its volume when shaped, and its open end portion adapted to be tightly secured to a reduced burner tip, substantially as described.

In testimony whereof I have hereunto set my hand this 27th day of November, 1916.

SVERRE GULBRANDSEN.

Witnesses:
THOS. K. LANCASTER,
J. H. JOHNSON.

Copies of this patent may be obtained for five cents each, by addressing the "Commissioner of Patents, Washington, D. C."